United States Patent
Tanaka et al.

(10) Patent No.: US 10,168,106 B2
(45) Date of Patent: Jan. 1, 2019

(54) HEAT EXCHANGER

(71) Applicant: KAWASAKI JUKOGYO KABUSHIKI KAISHA, Hyogo (JP)

(72) Inventors: Mitsuaki Tanaka, Kobe (JP); Kazuhide Hakamada, Akashi (JP); Minoru Nakayasu, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 24 days.

(21) Appl. No.: 15/507,913

(22) PCT Filed: Sep. 1, 2015

(86) PCT No.: PCT/JP2015/004437
§ 371 (c)(1),
(2) Date: Mar. 1, 2017

(87) PCT Pub. No.: WO2016/035327
PCT Pub. Date: Mar. 10, 2016

(65) Prior Publication Data
US 2017/0292794 A1 Oct. 12, 2017

(30) Foreign Application Priority Data
Sep. 2, 2014 (JP) ................................. 2014-178190

(51) Int. Cl.
*F28D 1/02* (2006.01)
*F28D 7/00* (2006.01)
(Continued)

(52) U.S. Cl.
CPC ....... *F28D 20/0034* (2013.01); *F28D 1/0213* (2013.01); *F28D 7/00* (2013.01);
(Continued)

(58) Field of Classification Search
CPC ........ F28D 20/0034; F28D 7/082; F28D 7/16; F28D 2020/006; F28D 9/0006;
(Continued)

(56) References Cited

U.S. PATENT DOCUMENTS 3,693,367 A * 9/1972 Di Peri ..................... F17C 3/02
220/560.08
5,088,280 A 2/1992 Scott-Scott et al.
(Continued)

FOREIGN PATENT DOCUMENTS

| | | |
|---|---|---|
| GB | 2 223 809 A | 4/1990 |
| JP | 2001-116198 A | 4/2001 |
| JP | 2010-104964 A | 5/2010 |

OTHER PUBLICATIONS

Written Opinion issued in PCT/JP2015/004437; dated Nov. 24, 2015.
(Continued)

*Primary Examiner* — Justin M Jonaitis
(74) *Attorney, Agent, or Firm* — Studebaker & Brackett PC

(57) ABSTRACT

A heat exchanger 1 comprises a shell 2 which has in an interior thereof a heat exchange chamber 20 in which a gas to be cooled or an intermediate medium is filled, and performs heat exchange directly or indirectly between liquid hydrogen and the gas to be cooled, in the interior of the heat exchange chamber 20; a tray 23 which is provided in the interior of the heat exchange chamber 20 and receives a liquefied gas and a deposited substance F which are generated by the heat exchange in the interior of the heat exchange chamber 20; and a liquid discharge mechanism (flashboard 22, drain port 25, and drain pipe 26) which discharges the liquefied gas from the tray 23 in a state in which the deposited substance F is left in the tray 23.

7 Claims, 4 Drawing Sheets

(51) Int. Cl.
*F28D 7/08* (2006.01)
*F28D 7/16* (2006.01)
*F28F 1/00* (2006.01)
*F28D 20/00* (2006.01)
*F28F 13/14* (2006.01)
*F28F 17/00* (2006.01)

(52) U.S. Cl.
CPC ............... *F28D 7/082* (2013.01); *F28D 7/16* (2013.01); *F28F 1/003* (2013.01); *F28F 13/14* (2013.01); *F28F 17/00* (2013.01); *F28D 7/08* (2013.01); *F28D 2020/006* (2013.01); *Y02E 60/142* (2013.01); *Y02E 70/30* (2013.01)

(58) Field of Classification Search
CPC ...... F28D 1/00; F28D 7/00; F28F 1/10; F28F 3/02; F28F 9/028; F28F 13/00; F28F 2009/222; F28F 2225/02; F28F 1/00; F28F 13/14; F28F 13/18; F28F 21/00; F28F 2013/001
USPC ....... 165/96, 94, 58, 60, 110, 111, 115, 117, 165/157, 164, 172, 177, 180
See application file for complete search history.

(56) References Cited

U.S. PATENT DOCUMENTS

| | | | | |
|---|---|---|---|---|
| 5,154,051 | A * | 10/1992 | Mouritzen | F02K 9/42 165/111 |
| 7,377,235 | B2 * | 5/2008 | Turini | F02M 21/06 123/1 A |
| 8,636,836 | B2 * | 1/2014 | Mudawar | C01B 3/0031 165/104.19 |
| 2007/0248849 | A1 * | 10/2007 | Preidel | H01M 8/04007 429/437 |
| 2011/0192174 | A1 | 8/2011 | Robidou et al. | |
| 2017/0291486 | A1 * | 10/2017 | Tanaka | B60K 15/01 |

OTHER PUBLICATIONS

International Preliminary Report on Patentability of the International Searching Authority; PCT/JP2015/004437; dated Mar. 7, 2017.
An Office Action issued by the Australian Patent Office dated Nov. 2, 2017, which corresponds to Australian Patent Application No. 2015310357 and is related to U.S. Appl. No. 15/507,913.
International Search Report issued in PCT/JP2015/004437; dated Nov. 24, 2015.

* cited by examiner

HEAT EXCHANGER

TECHNICAL FIELD

The present invention relates to a structure of a heat exchanger which performs heat exchange between liquid hydrogen and a gas to be cooled.

BACKGROUND ART

In recent years, as fuels of internal combustion engines such as gas turbine engines, studies have been conducted to use a hydrogen gas. Typically, the hydrogen gas is stored in a tank in a state of liquid hydrogen. The liquid hydrogen is vaporized into the hydrogen gas in a vaporizer and then the hydrogen gas is supplied to a combustor (burner) of the internal combustion engine. Cold generated by vaporization of the liquid hydrogen in the vaporizer has an extremely low temperature and is released to atmospheric air.

A natural gas conventionally used as the fuel of the internal combustion engine such as the gas turbine engine is typically stored in a tank in a state of a liquefied natural gas (LNG). The LNG is vaporized in the vaporizer and then the vaporized natural gas is supplied to the combustor of the internal combustion engine. It is known that cold generated by vaporization of the LNG in the vaporizer is utilized. For example, Patent Literature 1 discloses an air cooling device including a LNG vaporizer which vaporizes the LNG by heat exchange between the LNG and an intermediate medium (mixed alcohol), and an air cooler which cools air by heat exchange between the air and the intermediate medium having been cooled in the LNG vaporizer. This air cooling device cools the air by using the cold generated by vaporization of the LNG.

CITATION LIST

Patent Literature

Patent Literature 1: Japanese-Laid Open Patent Application Publication No. 2001-116198

SUMMARY OF INVENTION

Technical Problem

The normal (standard) boiling point of the LNG is about −162 degrees C., while the normal boiling point of the liquid hydrogen is about −253 degrees C. For this reason, if an attempt is made to exchange heat between the liquid hydrogen and the air according to the air cooling device disclosed in the above-described Patent Literature 1, the following phenomenon occurs due to the fact that the temperature of the liquid hydrogen is much lower than that of the LNG.

Solution to Problem

In the heat exchanger which performs heat exchange between the liquid hydrogen and the air, it is assumed that a phenomenon occurs, in which the air having been cooled by the heat exchange with the liquid hydrogen is changed into a liquefied gas, and moisture, oxygen, nitrogen, or the like contained in the air are deposited. Such a phenomenon need not be considered for the heat exchanger which performs heat exchange between the LNG and the air, because the normal boiling point of the LNG is higher than that of the air. If the liquefied gas and deposited substance are accumulated in the heat exchanger, the function of the heat exchanger may be degraded, or a frequent maintenance work may be required. In view of this, an object of the present invention is to provide a heat exchanger which is suitably used to perform heat exchange between the liquid hydrogen and the air.

A heat exchanger of the present invention comprises a heat exchange container which has in an interior thereof a heat exchange chamber in which a gas to be cooled or an intermediate medium is filled, and performs heat exchange directly or indirectly between liquid hydrogen and the gas to be cooled, in an interior of the heat exchange chamber; a tray which is provided in the interior of the heat exchange chamber and receives a liquefied gas and a deposited substance which are generated by the heat exchange in the interior of the heat exchange chamber; and a liquid discharge mechanism which discharges the liquefied gas from the tray to an outside area of the heat exchange chamber.

In accordance with this heat exchanger, the liquefied gas and the deposited substance of the gas to be cooled, which are generated by the heat exchange between the liquid hydrogen and the gas to be cooled, fall to the tray. Then, the liquid discharge mechanism selectively discharges the liquefied gas from the tray and hence the heat exchange chamber. Therefore, an unnecessary liquid gas can be discharged from the heat exchange chamber.

In the above heat exchanger, the liquid discharge mechanism is preferably configured to discharge the liquefied gas in a state in which the deposited substance is left in the tray. In accordance with this configuration, since only the liquefied gas is discharged from the tray, a liquid discharge path of the liquefied gas is not clogged with the deposited substance. This makes it possible to reduce the frequency of occurrence of a problem associated with the liquid discharge mechanism.

Preferably, the above heat exchanger comprises at least one heat transmission pipe inserted into the heat exchange container, the liquid hydrogen being flowed into the heat transmission pipe, and the tray is disposed below the at least one heat transmission pipe. In accordance with this configuration, since it is highly likely that the deposited substance is generated in the region that is in the vicinity of the heat transmission pipe, the generated deposited substance can be reliably collected into the tray.

In the above heat exchanger, preferably, the at least one heat transmission pipe includes a vacuum double-walled pipe defining an introduction portion introduced into the heat exchange chamber, and a single-walled pipe defining a portion other than the introduction portion, and the tray is disposed to cover a region that is below the single-walled pipe exposed in the interior of the heat exchange chamber. In accordance with this configuration, since it is highly likely that the deposited substance is generated in the region that is in the vicinity of the single-walled pipe, the generated deposited substance can be reliably collected into the tray.

In the above heat exchanger, the tray may be disposed in a bottom portion of the heat exchange chamber, and the liquid discharge mechanism may include a drain port which opens in the bottom portion of the heat exchange chamber so that the liquefied gas having overflowed out of the tray flows to the drain port, and a drain pipe connected to the drain port. In accordance with this configuration, since only the liquefied gas is discharged from the tray, the drain port and the drain pipe are not clogged with the deposited substance. This makes it possible to reduce the frequency of occurrence of a problem associated with the liquid discharge mechanism.

In the above heat exchanger, the heat exchanger may be a heat exchanger of an intermediate medium type, which performs the heat exchange between the liquid hydrogen and the gas to be cooled, by use of the intermediate medium, the heat exchange container may include an intermediate medium inlet which opens in an upper portion of the heat exchange chamber, and the tray may be disposed below a heat transmission pipe disposed in the vicinity of the intermediate medium inlet, of the at least one heat transmission pipe. In accordance with this configuration, since it is highly likely that the liquefied gas and the deposited substance of the intermediate medium are generated in the region that is in the vicinity of the heat transmission pipe disposed in the vicinity of the intermediate medium inlet, the generated liquefied gas and the generated deposited substance can be reliably collected into the tray.

In the above heat exchanger, the intermediate medium may be at least one of air, oxygen and nitrogen.

In the above heat exchanger, the gas to be cooled may be at least one of dry air, oxygen, nitrogen, and hydrogen.

Advantageous Effects of Invention

In accordance with the present invention, the liquefied gas and the deposited substance which are generated in the heat exchange chamber by heat exchange between the liquid hydrogen and the gas to be cooled can be collected into the tray, and the liquefied gas can be discharged from the tray to the outside area of the heat exchange chamber. Therefore, it becomes possible to realize a heat exchanger which is suitable for the heat exchange between the liquid hydrogen and the gas to be cooled.

DESCRIPTION OF EMBODIMENTS

Next, the embodiments of the present invention will be described with reference to the drawings. A heat exchanger of the present invention is configured to directly or indirectly exchange heat energy between liquid hydrogen (extremely low-temperature hydrogen) and a gas to be cooled, in order to cool the gas to be cooled and heat the liquid hydrogen. The gas to be cooled includes at least one of, for example, dry air, nitrogen, oxygen, and hydrogen. In the embodiments of the present invention which will be described below, the dry air is used as an example of the gas to be cooled, in order to obtain low-temperature dry air. The dry air is air obtained by removing steam from moist (wet) air.

[Embodiment 1]

Figure 1:
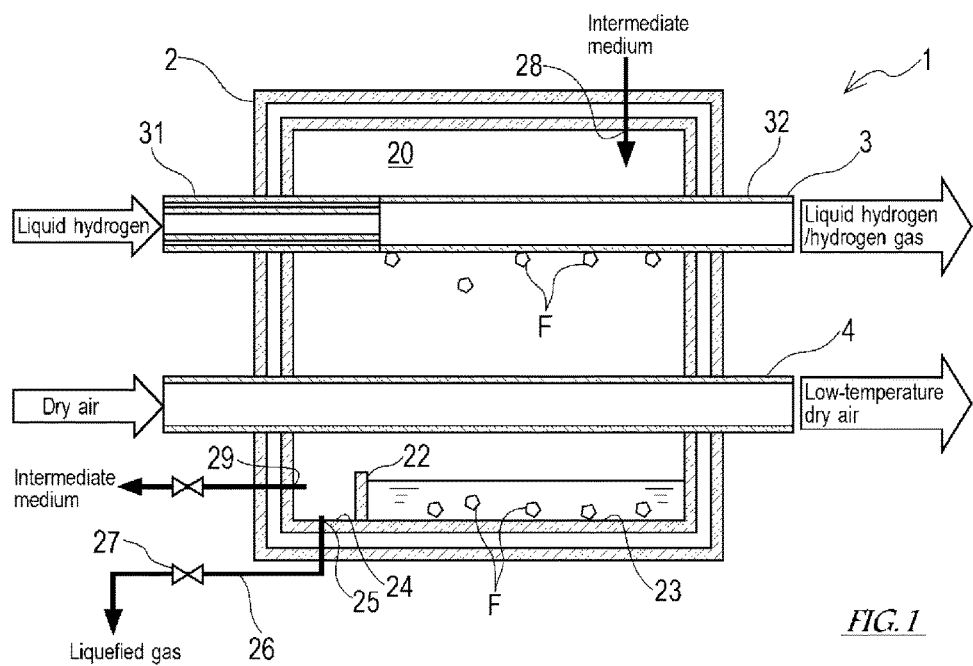
FIG. 1 is a sectional front view showing the schematic configuration of a heat exchanger which uses liquid hydrogen according to Embodiment 1 of the present invention.
Figure 2:
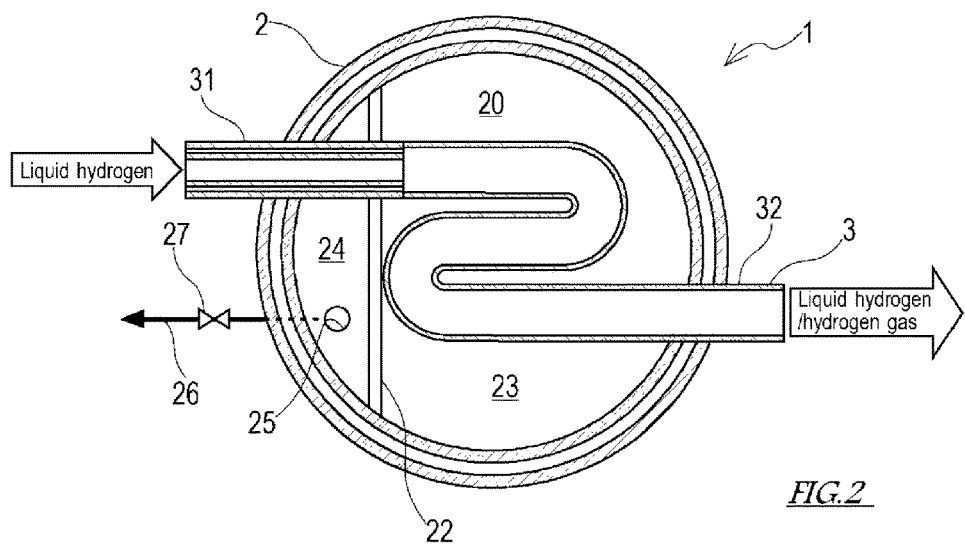
FIG. 2 is a sectional plan view showing the schematic configuration of the heat exchanger.

FIG. 1 is a sectional front view showing the schematic configuration of a heat exchanger 1 which uses the liquid hydrogen according to Embodiment 1 of the present invention. FIG. 2 is a sectional plan view showing the schematic configuration of the heat exchanger 1. FIG. 1 shows a vertical section of the heat exchanger 1 including a first heat transmission pipe 3 through which the liquid hydrogen is flowed and a second heat transmission pipe 4 through which the dry air is flowed. FIG. 2 shows a horizontal section of the heat exchanger 1 including the first heat transmission pipe 3.

As shown in FIGS. 1 and 2, the heat exchanger 1 according to Embodiment 1 of the present invention includes a shell 2 (intermediate medium type heat exchange container) which has in an interior thereof a heat exchange chamber 20 for performing heat exchange. The shell 2 is a vacuum double-walled heat insulating container and has a high heat retaining property due to vacuum heat insulation. An intermediate medium inlet 28 is provided at the upper portion of the shell 2, while an intermediate medium outlet 29 is provided at the lower portion of the shell 2. The heat exchange chamber 20 is filled with an intermediate medium. The intermediate medium includes at least one of, for example, air, oxygen, and nitrogen.

At least one first heat transmission pipe 3 is inserted into the upper portion of the shell 2. The first heat transmission pipe 3 is exposed in the interior of the heat exchange chamber 20. The liquid hydrogen is supplied from a liquid hydrogen tank (not shown) and is flowed through the first heat transmission pipe 3. A portion of the first heat transmission pipe 3 which is introduced into the heat exchange chamber 20 is constituted by a vacuum double-walled pipe 31 having a high heat retaining property due to vacuum heat insulation. A portion of the first heat transmission pipe 3, which is other than the introduction portion, includes a single-walled pipe 32. A connection section (change section) of the vacuum double-walled pipe 31 and the single-walled pipe 32 is located inside the heat exchange chamber 20. To secure a sufficient heat transmission area of the first heat transmission pipe 3, the pipe length of the first heat transmission pipe 3 is set so that the pipe length of the vacuum double-walled pipe 31 is shorter and the pipe length of the single-walled pipe 32 is longer. To increase the heat transmission area of the first heat transmission pipe 3 for facilitating the heat transmission, it is desired that the first heat transmission pipe 3 be bent at several points, and have fins (not shown) on its periphery, in the interior of the shell 2.

In the single-walled pipe 32 of the first heat transmission pipe 3, and a region that is in the vicinity of the single-walled pipe 32, exchange of heat energy between the liquid hydrogen present inside the pipe and the intermediate medium present outside the pipe occurs. By this heat exchange, the temperature of the intermediate medium decreases, and the temperature of the liquid hydrogen increases. Thus, the liquid hydrogen having been flowed into the first heat transmission pipe 3 is discharged from the first heat transmission pipe 3 as the liquid hydrogen or/and the hydrogen gas. The hydrogen gas discharged from the first heat transmission pipe 3 is sent to, for example, a combustor (burner) of a hydrogen gas turbine engine, and used as a fuel of the hydrogen gas turbine engine.

At least one second heat transmission pipe 4 is inserted into the shell 2 at a location that is below the first heat transmission pipe 3. The second heat transmission pipe 4 is exposed in the interior of the heat exchange chamber 20. Dry air is supplied from a dry air source (not shown) and flowed into the second heat transmission pipe 4. The second heat transmission pipe 4 is mainly formed by a single-walled pipe. To facilitate the heat transmission, the second heat transmission pipe 4 may be bent at several points or have fins on its periphery.

In the second heat transmission pipe 4 and a region that is in the vicinity of the second heat transmission pipe 4, exchange of heat energy between the dry air present inside the pipe and the intermediate medium present outside the pipe occurs. By this heat exchange, the temperature of the intermediate medium increases, and the temperature of the dry air decreases. Thus, the dry air having been flowed into the second heat transmission pipe 4 is discharged from the second heat transmission pipe 4 as low-temperature dry air in a lower temperature state. The low-temperature dry air having been discharged from the second heat transmission pipe 4 is used as, for example, a cooling gas in a cryogenic air separator, cooling air in a drain separator (brackish water separator), a refrigerant of a cooling water cooler, and the like. In this way, cold generated by vaporization of the liquid hydrogen can be efficiently utilized.

It is known that the normal (standard) boiling point of hydrogen is about −253 degrees C., the normal boiling point of oxygen is about −183 degrees C., the normal melting point of oxygen is about −218 degrees C., the normal boiling point of nitrogen is about −196 degrees C., the normal melting point of nitrogen is about −210 degrees C., and the normal boiling point of the air is about −190 degrees C. The normal boiling point is defined as a boiling point under the atmospheric pressure (1 atm=101325 Pa). The normal melting point is defined as a melting point under the atmospheric pressure. For example, in a case where exchange of the heat energy between the liquid hydrogen at −253 degrees C. and the intermediate medium occurs under the atmospheric pressure, the temperature of the intermediate medium becomes lower than its boiling point temperature and the intermediate medium is liquefied, or the liquefied intermediate medium is solidified and deposited. In view of this, a tray 23 is provided in the bottom portion of the heat exchange chamber 20 to receive the liquefied gas (e.g., liquefied air, liquid nitrogen, liquid oxygen, etc.) generated by cooling and liquefying the intermediate medium, and the deposited substance F (e.g., ice, solid nitrogen, solid oxygen, etc.) of the liquefied gas.

The tray 23 has a receiving area including the whole of a range in which the tray 23 overlaps with the single-walled pipe 32 exposed in the interior of the heat exchange chamber 20, in a plan view. Since it is supposed that the deposited substance F is formed in a region that is in the vicinity of the single-walled pipe 32 of the first heat transmission pipe 3, the tray 23 is disposed to cover the whole of a region below the single-walled pipe 32, to which the deposited substance F may fall. The tray 23 has a shape in which its peripheral portion is higher than the remaining portion to prevent the captured deposited substance F of the liquefied gas from flowing out of the tray 23.

In the present embodiment, a flashboard 22 swells from the bottom surface of the heat exchange chamber 20. The tray 23 is provided as a space surrounded by the flashboard 22, and the bottom surface and wall surface of the heat exchange chamber 20. The flashboard 22 is located outward relative to the connection section of the vacuum double-walled pipe 31 and the single-walled pipe 32, from the perspective of the center of the heat exchange chamber 20. The flashboard 22 partitions the bottom portion of the heat exchange chamber 20 into the tray 23 and a liquid discharge section 24, which is other than the tray 23.

The liquid discharge section 24 is provided with a drain port 25 which opens therein. A drain pipe 26 is connected to the drain port 25. The drain pipe 26 is provided with an on-off (opening/closing) valve 27. The flashboard 22, the drain port 25, the drain pipe 26, and the like constitute a liquid discharge mechanism which discharges the liquefied gas accumulated in the tray 23 from the heat exchange chamber 20, in a state in which the deposited substance F is left in the tray 23. In this liquid discharge mechanism, when the liquid level of the tray 23 exceeds the flashboard 22, the liquefied gas in the tray 23 moves beyond the flashboard 22 and overflows to the liquid discharge section 24, in a state in which the deposited substance F is left in the tray 23. The deposited substance F is submerged in the liquefied gas inside the tray 23. Therefore, the deposited substance F is held back by the flashboard 22, and cannot flow out toward the liquid discharge section 24 (drain port 25). The liquefied gas which has overflowed to the liquid discharge section 24 and the liquefied gas of the intermediate medium which has fallen directly to the liquid discharge section 24 are discharged to an outside area of the shell 2 through the drain port 25 and the drain pipe 26. In this way, of the liquefied gas and the deposited substance F which are captured in the tray 23, the liquefied gas is selectively discharged. This makes it possible to reduce the frequency of occurrence of the problem associated with the liquid discharge mechanism that the discharge passage (namely, the drain port 25 and the drain pipe 26) of the liquefied gas is clogged with the deposited substance F.

[Embodiment 2]

Figure 3:
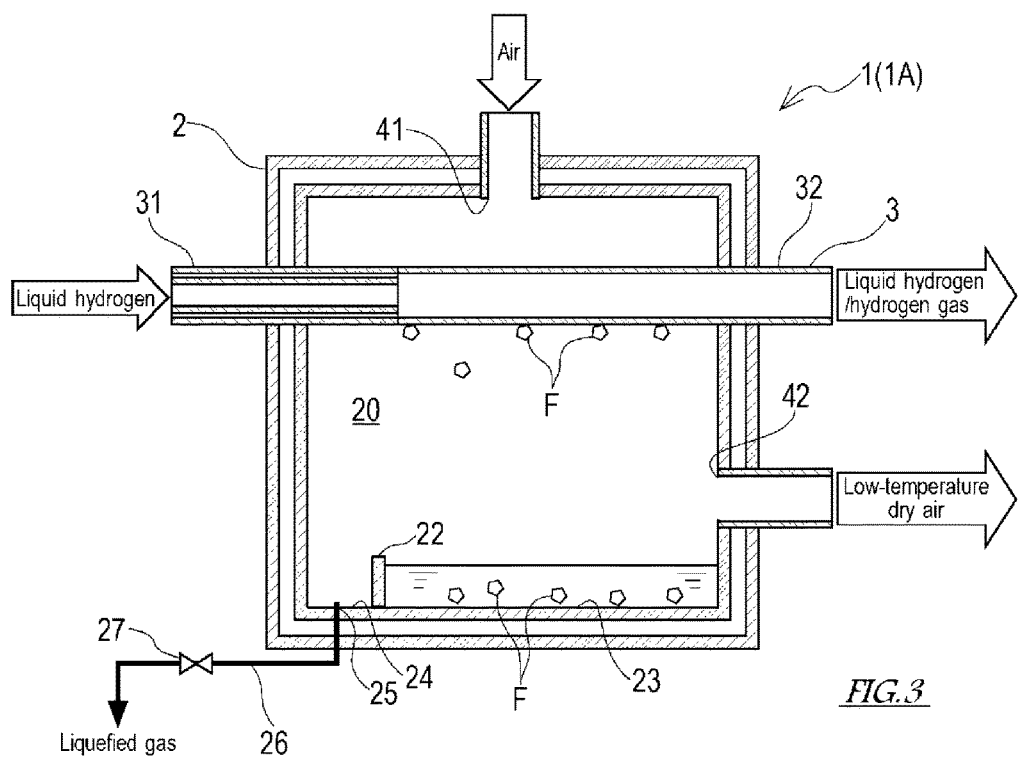
FIG. 3 is a sectional front view showing the schematic configuration of a heat exchanger which uses the liquid hydrogen according to Embodiment 2 of the present invention.

Next, Embodiment 2 of the present invention will be described. FIG. 3 is a sectional front view showing the schematic configuration of a heat exchanger 1A which uses liquid hydrogen according to Embodiment 2 of the present invention. In the drawing referred to for the description of the present embodiment, the members which are identical to or similar to those of Embodiment 1 described above are designated by the same reference symbols, and will not be described in repetition.

As shown in FIG. 3, the heat exchanger 1A according to Embodiment 2 does not include the intermediate medium inlet 28, the intermediate medium outlet 29, and at least one second heat transmission pipe 4 of Embodiment 1 described above. Instead of these, the heat exchanger 1A according to Embodiment 2 includes at least one air supply port 41 which opens at a location that is above the first heat transmission pipe 3 located inside the heat exchange chamber 20, and at least one low-temperature dry air discharge port 42 which opens at a location that is below the first heat transmission pipe 3 located inside the heat exchange chamber 20.

In the heat exchanger 1A having the above-described configuration, when the liquid hydrogen is flowed into the first heat transmission pipe 3 and the air is introduced into the heat exchange chamber 20 through the supply port 41, exchange of heat energy between the liquid hydrogen present inside the pipe and the air present outside the pipe occurs, in the single-walled pipe 32 of the first heat transmission pipe 3 and a region that is in the vicinity of the single-walled pipe 32. By this heat exchange, the temperature of the liquid hydrogen increases and the temperature of the air decreases. Due to the decrease in the temperature of the air, a part of the air is changed into liquefied air (liquefied gas). In addition, a part of the liquefied air is changed into the deposited substance F by solidification. The liquefied air and the deposited substance F fall to and are received in the tray 23. The deposited substance F contains a moisture in the air. The moisture is removed from the air having been introduced into the heat exchange chamber 20, and as a result, the air filled in the heat exchange chamber 20 is changed into low-temperature dry air (dry air in a low temperature state). As described above, in the heat exchanger 1A, the liquid hydrogen having been flowed into the first heat transmission pipe 3 is discharged from the first heat transmission pipe 3 as the liquid hydrogen or/and the hydrogen gas, while the air having been introduced into the heat exchange chamber 20 through the supply port 41 is discharged from the discharge port 42 as the low-temperature dry air which is in a lower temperature state and dried.

[Embodiment 3]

Figure 4:
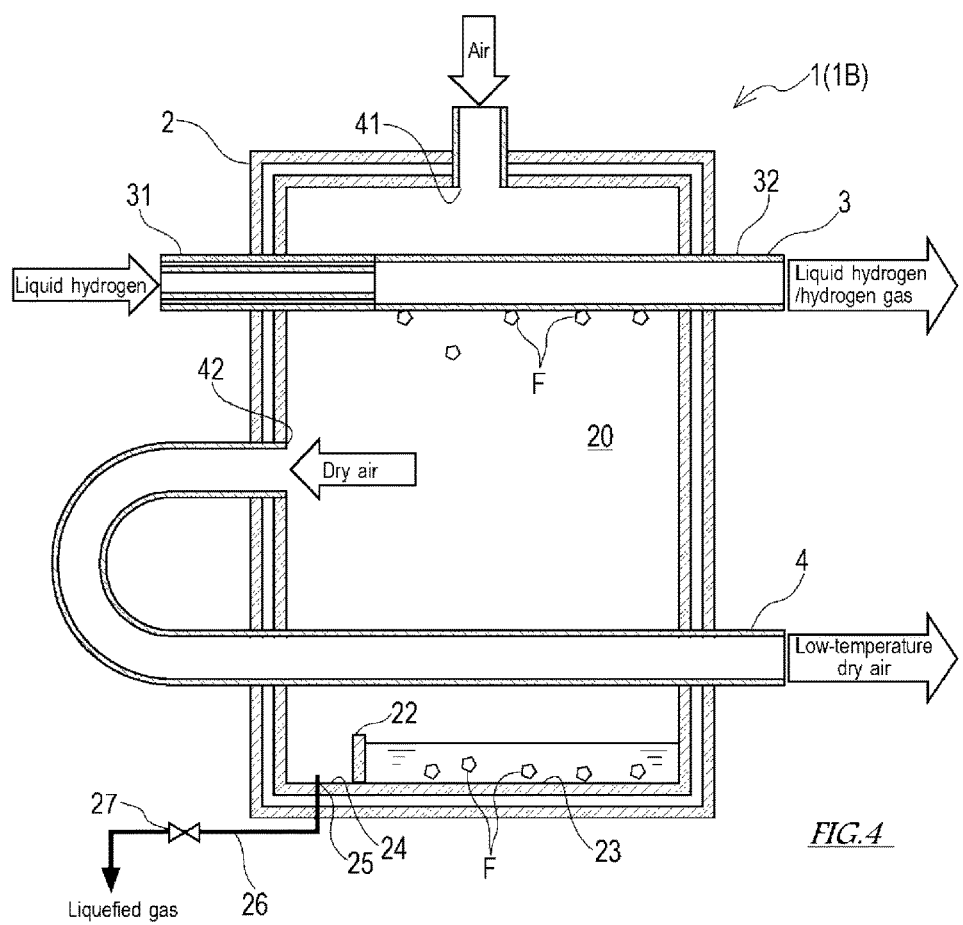
FIG. 4 is a sectional front view showing the schematic configuration of a heat exchanger which uses the liquid hydrogen according to Embodiment 3 of the present invention.

Next, Embodiment 3 of the present invention will be described. FIG. 4 is a sectional front view showing the schematic configuration of a heat exchanger 1B which uses the liquid hydrogen according to Embodiment 3 of the present invention. In the drawing referred to for the description of the present embodiment, the members which are identical to or similar to those of Embodiment 1 described above are designated by the same reference symbols, and will not be described in repetition.

As shown in FIG. 4, in the heat exchanger 1B according to Embodiment 3, the shell 2 is not provided with the intermediate medium inlet 28, and the intermediate medium outlet 29 of Embodiment 1 described above. Instead of these, the heat exchanger 1B according to Embodiment 3 includes at least one air supply port 41 which opens at a location that is above the first heat transmission pipe 3 located inside the heat exchange chamber 20, and at least one dry air discharge port 42 which opens at a location that is between the first heat transmission pipe 3 and the second heat transmission pipe 4 in a vertical direction, the first and second heat transmission pipes 3, 4 being located inside the heat exchange chamber 20. The discharge port 42 is connected to the inlet of the second heat transmission pipe 4.

In the heat exchanger 1B having the above-described configuration, when the liquid hydrogen is flowed into the first heat transmission pipe 3 and the air is introduced into the heat exchange chamber 20 through the supply port 41, exchange of heat energy between the liquid hydrogen present inside the pipe and the air present outside the pipe occurs, in the single-walled pipe 32 of the first heat transmission pipe 3 and a region that is in the vicinity of the single-walled pipe 32. By this heat exchange, the temperature of the liquid hydrogen increases and the temperature of the air decreases. Due to the decrease in the temperature of the air, a part of the air is changed into liquefied air (liquefied gas). In addition, a part of the liquefied air is changed into the deposited substance F by solidification. The liquefied air and the deposited substance F fall to and are received in the tray 23. The deposited substance F contains a moisture in the air. The moisture is removed from the air having been introduced into the heat exchange chamber 20, and as a result, the air filled in the heat exchange chamber 20 is changed into low-temperature dry air. Then, the dry air flows out of the interior of the heat exchange chamber 20 through the discharge port 42, and flows into the second heat transmission pipe 4. Since the second heat transmission pipe 4 is located below the discharge port 42, the temperature of the dry air present in a region that is in the vicinity of the second heat transmission pipe 4 is somewhat lower than that of the dry air flowing into the second heat transmission pipe 4 through the discharge port 42. In the second heat transmission pipe 4 and a region that is in the vicinity of the second heat transmission pipe 4, exchange of heat energy between the dry air present inside the pipe and the dry air present outside the pipe occurs. Thus, the temperature of the dry air present outside the pipe increases, and the temperature of the dry air present inside the pipe further decreases.

As described above, in the heat exchanger 1B, the liquid hydrogen having been flowed into the first heat transmission pipe 3 is discharged from the first heat transmission pipe 3 as the liquid hydrogen or/and the hydrogen gas, while the air having been introduced into the heat exchange chamber 20 through the supply port 41 is discharged from the second heat transmission pipe 4 as the low-temperature dry air which is in a lower temperature state and dried.

[Embodiment 4]

Figure 5:
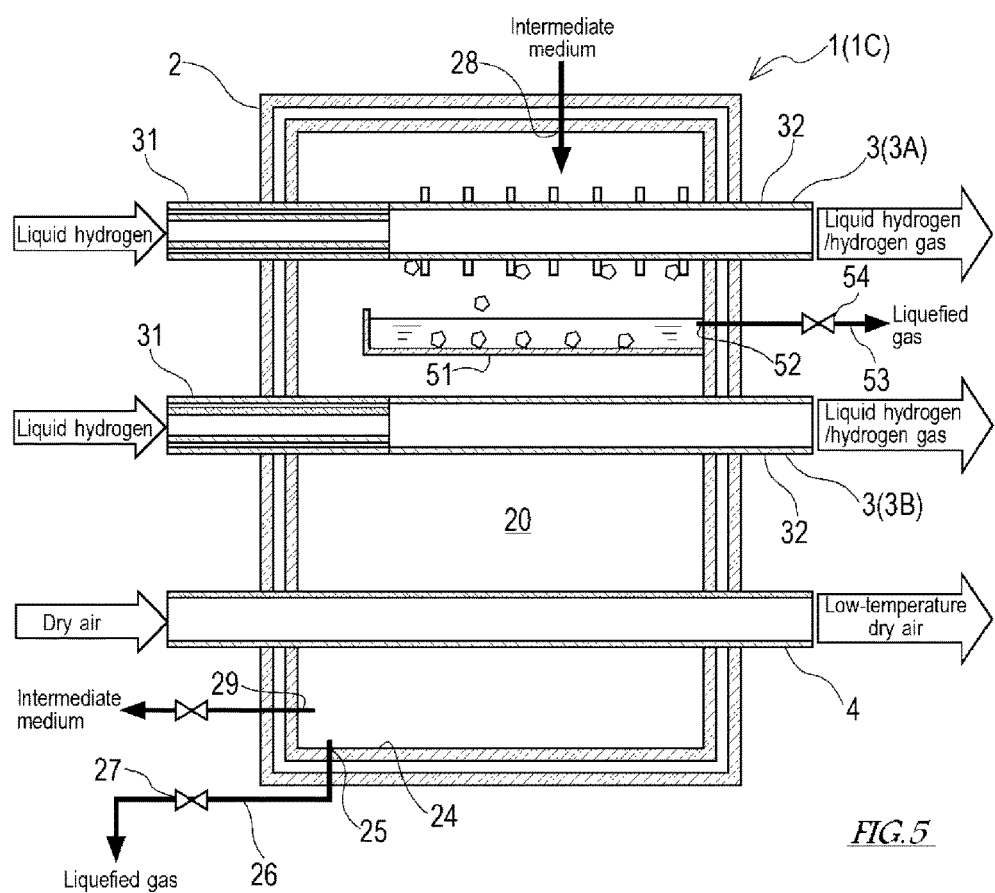
FIG. 5 is a sectional front view showing the schematic configuration of a heat exchanger which uses the liquid hydrogen according to Embodiment 4 of the present invention.

Next, Embodiment 4 of the present invention will be described. FIG. 5 is a sectional front view showing the schematic configuration of a heat exchanger 1C which uses the liquid hydrogen according to Embodiment 4 of the present invention. In the drawing referred to for the description of the present embodiment, the members which are identical to or similar to those of Embodiment 1 described above are designated by the same reference symbols, and will not be described in repetition.

As shown in FIG. 5, in the heat exchanger 1C according to Embodiment 4, at least two first heat transmission pipes arranged in a vertical direction, which are at least one first heat transmission pipe 3 (3A) at an upper side and at least one first heat transmission pipe 3 (3B) at a lower side, are inserted into the shell 2. The first heat transmission pipe 3A at the upper side is disposed in the upper portion of the heat exchange chamber 20 and in the vicinity of the intermediate medium inlet 28. The first heat transmission pipe 3B at the lower side is disposed between the first heat transmission pipe 3A and the second heat transmission pipe 4 in the vertical direction. In addition, the heat exchanger 1C is provided with a tray 51 which receives the deposited substance F of the intermediate medium deposited in a region that is in the vicinity of the first heat transmission pipe 3A at the upper side. The tray 51 is desirably located between the first heat transmission pipe 3A at the upper side and the first heat transmission pipe 3B at the lower side in the vertical direction. The tray 51 is provided with a drain port 52 through which only the liquefied gas is discharged from the upper portion of the tray 51. A drain pipe 53 including an on-off (opening/closing) valve 54 is connected to the drain port 52. The drain port 52 and the drain pipe 53 constitute a liquid discharge mechanism which discharges the liquefied gas from the tray 51 to the outside area of the heat exchange chamber 20 in a state in which the deposited substance F is left in the tray 51.

In the heat exchanger 1C having the above-described configuration, when the liquid hydrogen is flowed into the first heat transmission pips 3 (3A, 3B), exchange of heat energy between the intermediate medium and the liquid hydrogen occurs. By this heat exchange, the temperature of the intermediate medium decreases, and the temperature of the liquid hydrogen increases. In a region that is in the vicinity of the first heat transmission pipe 3A at the upper side, the intermediate medium is changed into the liquefied gas, and a part of the liquefied gas is changed into the deposited substance F. The deposited substance F and the liquefied gas fall to the tray 51. In this way, the deposited substance F and the liquefied gas are accumulated in the tray 51. When the liquid level of the tray 51 increases, the on-off valve 54 is opened. The deposited substance F is submerged in the liquefied gas in the tray 51. Therefore, only the liquefied gas is discharged from the drain port 52 which opens in the upper portion of the tray 51 through the drain pipe 53, and the deposited substance F is left in the tray 51.

This makes it possible to prevent the drain port 52 and the drain pipe 53 from being clogged with the deposited substance F.

As described above, the deposited substance F of the liquefied gas of the intermediate medium is deposited in the region that is in the vicinity of the first heat transmission pipe 3A at the upper side. Therefore, the deposited substance F is not generated from the intermediate medium present in a region that is in the vicinity of first heat transmission pipe 3B at the lower side. For this reason, fundamentally, it is not necessary to provide the tray 23 in the bottom portion of the heat exchange chamber 20. However, in a case where the intermediate medium contains a large amount of components which will be changed into the deposited substance F, or it is likely that the deposited substance F is generated from the intermediate medium present in the region that is in the vicinity of the first heat transmission pipe 3B at the lower side, the tray 23 may be provided in the bottom portion of the heat exchange chamber 20.

Further, exchange of heat energy between the intermediate medium having been cooled by the heat exchange with the liquid hydrogen and the dry air having been flowed into the second heat transmission pipe 4 occurs. By this heat exchange, the temperature of the intermediate medium increases and the temperature of the dry air decreases. As described above, in the heat exchanger 1C, the liquid hydrogen having been introduced into the first heat transmission pipes 3 is discharged as the liquid hydrogen or/and the hydrogen gas, while the dry air having been introduced into the second heat transmission pipe 4 is discharged as the low-temperature dry air in a lower temperature state.

In the heat exchanger 1C, the first heat transmission pipe 3 includes the first heat transmission pipe 3A at the upper side and the first heat transmission pipe 3B at the lower side which are arranged in the vertical direction, and the tray 51 is disposed below the first heat transmission pipe 3A at the upper side. However, the layout of the first heat transmission pipes 3 and the tray 51 is not limited to the above. The intermediate medium introduced into the heat exchange chamber 20 through the intermediate medium inlet 28 tends to be deposited in the region that is in the vicinity of the first heat transmission pipe 3 which the intermediate medium contacts first. In view of this, it is sufficient that the tray 51 is disposed at a location that is in the vicinity of the intermediate medium inlet 28 and below the first heat transmission pipe 3 which the intermediate medium having been introduced into the heat exchange chamber 20 contacts first.

The preferred embodiments of the present invention have been described above. The above-described configuration may be changed as described below, for example.

Although in the above-described embodiments, the heat exchanger 1 is a heat exchanger of a shell and tube type (or a shell and fin tube type), the type of the heat exchanger 1 is not limited to these.

Although in the above-described embodiments, the interior of the heat exchange chamber 20 is in an atmospheric pressure state, the interior of the heat exchange chamber 20 may be pressurized.

Although in the above-described embodiments, the trays 23, 51 are integrated with the shell 2, the trays 23, 51 may be independently configured and detachable from the shell 2.

REFERENCE SIGNS LIST

1 heat exchanger
2 shell (heat exchange container)
3 first heat transmission pipe
31 vacuum double-walled pipe
32 single-walled pipe
4 second heat transmission pipe
20 heat exchange chamber
22 flashboard
23 tray
24 liquid discharge section
25 drain hole
26 drain pipe
27 on-off valve
28 inlet
29 outlet
51 tray
52 drain port
53 drain pipe
54 on-off valve

The invention claimed is:

1. A heat exchanger comprising:
   a heat exchange container which has in an interior thereof a heat exchange chamber in which a gas to be cooled or an intermediate medium is filled, and performs heat exchange directly or indirectly between liquid hydrogen and the gas to be cooled, in an interior of the heat exchange chamber;
   at least one heat transmission pipe inserted into the heat exchange container, the liquid hydrogen being flowed into the heat transmission pipe;
   a tray which is disposed below the at least one heat transmission pipe in the interior of the heat exchange chamber and receives a liquefied gas and a deposited substance which are generated by the heat exchange in the interior of the heat exchange chamber; and
   a liquid discharge mechanism which discharges the liquefied gas from the tray to an outside area of the heat exchange chamber,
   wherein the at least one heat transmission pipe includes a vacuum double-walled pipe defining an introduction portion introduced into the heat exchange chamber, and a single-walled pipe defining a portion other than the introduction portion, and
   wherein the tray is disposed to cover a region that is below the single-walled pipe exposed in the interior of the heat exchange chamber.

2. The heat exchanger according to claim 1,
   wherein the heat exchanger is a heat exchanger of an intermediate medium type, which performs the heat exchange between the liquid hydrogen and the gas to be cooled, by use of the intermediate medium,
   wherein the heat exchange container includes an intermediate medium inlet which opens in an upper portion of the heat exchange chamber, and
   wherein the tray is disposed below a heat transmission pipe disposed in the vicinity of the intermediate medium inlet, of the at least one heat transmission pipe.

3. The heat exchanger according to claim 2,
   wherein the intermediate medium is at least one of air, oxygen and nitrogen.

4. A heat exchanger comprising:
   a heat exchange container which has in an interior thereof a heat exchange chamber in which a gas to be cooled or an intermediate medium is filled, and performs heat exchange directly or indirectly between liquid hydrogen and the gas to be cooled, in an interior of the heat exchange chamber;
   a tray which is provided in the interior of the heat exchange chamber and receives a liquefied gas and a deposited substance which are generated by the heat exchange in the interior of the heat exchange chamber; and a liquid discharge mechanism which discharges the liquefied gas from the tray to an outside area of the heat exchange chamber, wherein the tray is disposed in a bottom portion of the heat exchange chamber, and wherein the liquid discharge mechanism includes a drain port which opens in the bottom portion of the heat exchange chamber so that the liquefied gas having overflowed out of the tray flows to the drain port, and a drain pipe connected to the drain port.

5. A heat exchanger comprising:

a heat exchange container which has in an interior thereof a heat exchange chamber in which a gas to be cooled or an intermediate medium is filled, and performs heat exchange directly or indirectly between liquid hydrogen and the gas to be cooled, in an interior of the heat exchange chamber;

at least one heat transmission pipe inserted into the heat exchange container, the liquid hydrogen being flowed into the heat transmission pipe;

a tray which is disposed below the at least one heat transmission pipe in the interior of the heat exchange chamber and receives a liquefied gas and a deposited substance which are generated by the heat exchange in the interior of the heat exchange chamber; and a liquid discharge mechanism which discharges the liquefied gas from the tray to an outside area of the heat exchange chamber, wherein the heat exchanger is a heat exchanger of an intermediate medium type, which performs the heat exchange between the liquid hydrogen and the gas to be cooled, by use of the intermediate medium, wherein the heat exchange container includes an intermediate medium inlet which opens in an upper portion of the heat exchange chamber, and wherein the tray is disposed below a heat transmission pipe disposed in the vicinity of the intermediate medium inlet, of the at least one heat transmission pipe.

6. The heat exchanger according to claim 5, wherein the intermediate medium is at least one of air, oxygen and nitrogen.

7. A heat exchanger comprising:

a heat exchange container which has in an interior thereof a heat exchange chamber in which a gas to be cooled or an intermediate medium is filled, and performs heat exchange directly or indirectly between liquid hydrogen and the gas to be cooled, in an interior of the heat exchange chamber;

a tray which is provided in the interior of the heat exchange chamber and receives a liquefied gas and a deposited substance which are generated by the heat exchange in the interior of the heat exchange chamber; and a liquid discharge mechanism which discharges the liquefied gas from the tray to an outside area of the heat exchange chamber, wherein the liquid discharge mechanism is configured to discharge the liquefied gas in a state in which the deposited substance is left in the tray, wherein the tray is disposed in a bottom portion of the heat exchange chamber, and wherein the liquid discharge mechanism includes a drain port which opens in the bottom portion of the heat exchange chamber so that the liquefied gas having overflowed out of the tray flows to the drain port, and a drain pipe connected to the drain port.

* * * * *